US012699466B2

(12) United States Patent (10) Patent No.: US 12,699,466 B2
Heer (45) **Date of Patent: \*Aug. 4, 2026**

(54) SYSTEM AND METHOD FOR ALTERATION OF AND INTERPRETATION OF DATA FROM INPUT DEVICES

(71) Applicant: Grady Interface Solutions, LLC, El Dorado Hills, CA (US)

(72) Inventor: Mitchell Grady Heer, El Dorado Hills, CA (US)

(73) Assignee: Grady Interface Solutions, LLC, El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,418

(22) Filed: Oct. 24, 2020

(65) Prior Publication Data

US 2021/0041966 A1 Feb. 11, 2021

Related U.S. Application Data

(63) Continuation-in-part of application No. 16/559,625, filed on Sep. 3, 2019.

(60) Provisional application No. 62/726,150, filed on Aug. 31, 2018.

(51) Int. Cl.
G06F 3/0354 (2013.01)
G06F 3/038 (2013.01)

(52) U.S. Cl.
CPC .......... G06F 3/03543 (2013.01); G06F 3/038 (2013.01)

(58) Field of Classification Search
None
See application file for complete search history.

(56) References Cited

U.S. PATENT DOCUMENTS

| | | | | |
|---|---|---|---|---|
| 2007/0132733 A1* | 6/2007 | Ram | ................... | G06F 3/03544 |
| | | | | 345/163 |
| 2009/0160774 A1* | 6/2009 | Lee | ..................... | G06F 3/03543 |
| | | | | 345/166 |
| 2012/0293437 A1* | 11/2012 | Zuo | ........................ | G06F 3/0238 |
| | | | | 345/173 |
| 2016/0124605 A1* | 5/2016 | Covington | .......... | G06F 3/04855 |
| | | | | 345/173 |
| 2016/0291989 A1* | 10/2016 | Spitzer | ................ | G06F 9/44505 |
| 2017/0336883 A1* | 11/2017 | Pavlou | ................ | G06F 3/03543 |

* cited by examiner

*Primary Examiner* — Joseph R Haley
(74) *Attorney, Agent, or Firm* — Bryan E. Repetto; Repetto Law, P.C.

(57) ABSTRACT

Disclosed is a computerized system and method for altering the sensitivity of computer input devices such as mice. The disclosed method relies on a graphic user interface, through which a user can alter input device sensitivity by altering points on an x/y axis wherein the y axis is defined by sensitivity and the x axis is defined by movement of the input device. Alternative embodiments also comprise delay mechanisms, and multiple user profiles.

12 Claims, 7 Drawing Sheets

SYSTEM AND METHOD FOR ALTERATION OF AND INTERPRETATION OF DATA FROM INPUT DEVICES

PRIORITY CLAIM

This application is a Continuation-in-Part of U.S. patent application Ser. No. 16/559,625, filed on Sep. 3, 2019, which claimed priority to U.S. Provisional Patent Application 62/726,150, filed on Aug. 31, 2018. These applications are incorporated herein by reference.

BACKGROUND

Altering the sensitivity of a computer input device, such as a mouse, joystick, touch pad, or other input device is desirable in many fields. Often, it is desirable to alter settings on a device used for multiple applications. For example, one may desire a different sensitivity for a mouse when used for word processing applications than the sensitivity of the same mouse when used for gaming purposes. Even when playing different games, it is often advantageous for a user to change mouse settings for different games. Other fields of endeavor where alteration of input device sensitivity may be advantageous include, but are not limited to, robotics, medical devices, aviation, automotive applications, and various computing applications.

Among users of mice, and similar devices, there has been a demand for an easy and reliable way to change sensitivity settings. The demand is especially strong among users of computer games, as changes in sensitivity settings can enhance the gaming experience, and allow a user to optimize his or her skill.

"Anticheat" mechanisms deployed in various gaming programs, and through various gaming platforms, also presents unique challenges to implementation of applications to modulate detected sensitivity.

BRIEF DESCRIPTION

Data received from computer input devices, such as mice, joysticks, gaming controllers, and other devices is interpreted based on sensitivity. Such sensitivity can be interpreted by a computer in many ways, depending on the distance traveled by the input device per unit time. By altering sensitivity, data from input devices can be used for differing tasks. Such tasks have utility in fields such as gaming, robotics, virtual reality, and any other field wherein modification of an input device may be necessary or desirable to achieve a given task. Disclosed herein is a system and method wherein the sensitivity of a computer input device may be altered through a user interface.

FIGURES

DETAILED DESCRIPTION

The disclosed system and methods can be deployed on any operating system. The purpose of the software is to increase the precision of any input device by applying fine-tuned acceleration settings.

In certain embodiments, the disclosed computerized system may comprise a central processor, computer readable media, computer readable instructions encoding the disclosed methods, one or more input devices, and a monitor or other visual display device. Input devices may be a mouse, or any other input device wherein interpretation of the input sensitivity may be altered. Computer readable media encodes computer executable instructions for carrying out various embodiments of the methods set forth herein. In certain embodiments, the computer readable media that encodes computer executable instructions may be coupled to the processor, be included as a component in a computing device (including, but not limited to, a tablet, a computer, a laptop computer, a smartphone, a gaming console, or any other electronic device), or it may reside in, or be coupled to the hardware, of one or more computer input devices (including, but not limited to, a joystick, a touchpad, a mouse, gaming controller, or other electronic device). In alternative embodiments, the computer executable instructions may reside on a remote or network device or server.

Acceleration, in the context of device sensitivity, can be defined as the sensitivity that is related to the speed at which the device is moved. A sensitivity with no acceleration has a 1:1 relationship between the data from the device and the resulting output. This is often seen when obtaining data from a mouse and applying it to the pointer on a screen. Other common examples include accelerometers and gyroscopes. Any device that applies a sensitivity can have acceleration so long as some measurement of speed can be ascertained.

The disclosed system comprises a program that allows users to adjust the acceleration settings of input devices, such as mice. It offers the most control ever over acceleration settings, presents the information using a simple interface and displays information that confer significant advantages over existing technology. Current solutions offer less control and have significantly more complex interfaces. Even an expert will struggle for some time with existing software because of the complexity and lack of relevant information provided. The disclosed methods aim to solve these issues and tackle the challenge of presenting the complex ideas and mathematics in a simple, user friendly manner.

Figure 7:
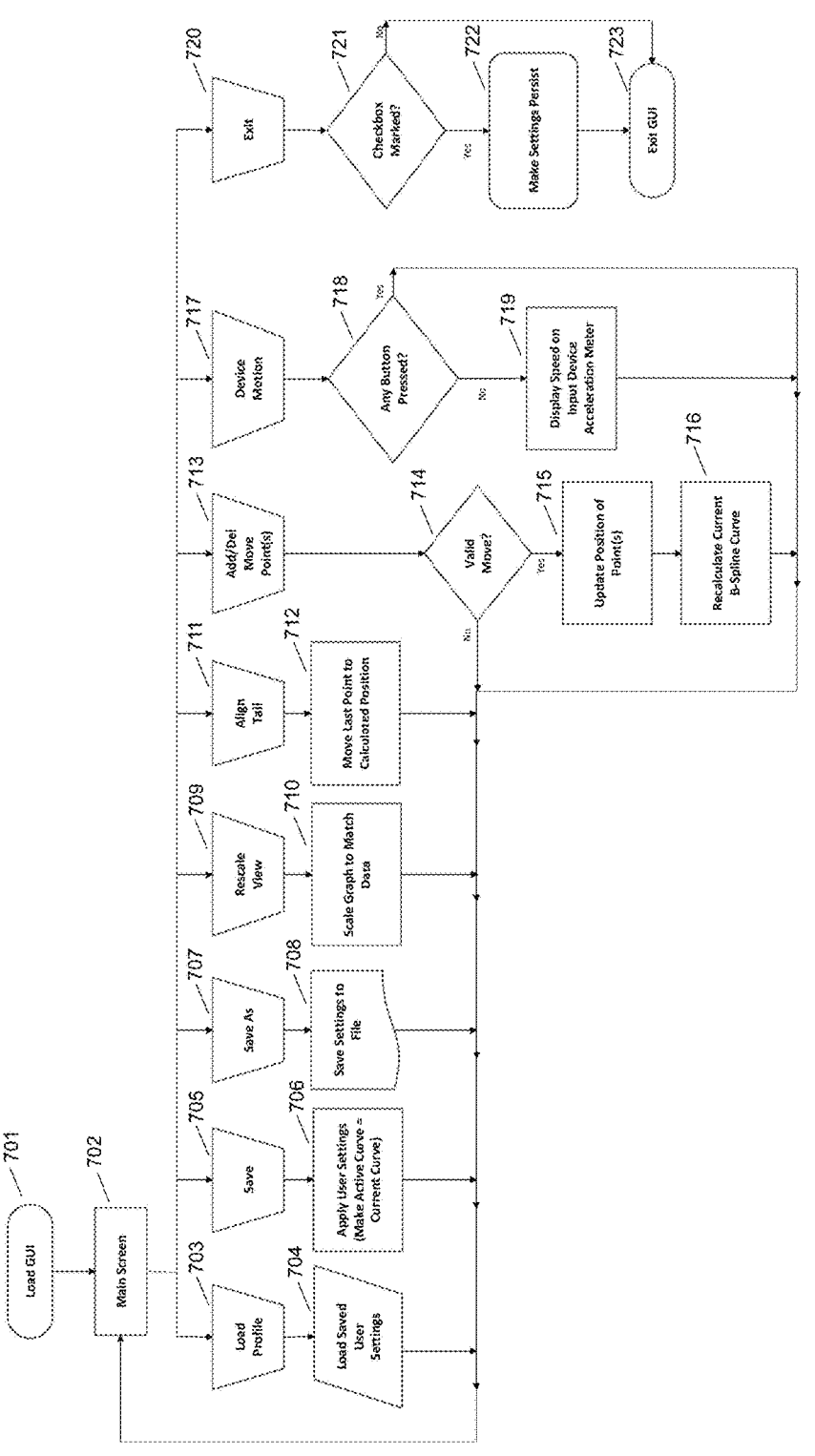
FIG. 7 illustrates a flowchart, illustrating an embodiment of a method to alter and interpret data from a computer input device.

FIG. 7 provides a general overview of method carried out by the system. When a user is using the system, the user will typically be situated in front of a monitor. The user will carry out the steps consistent with his or her device to open a graphic user interface 701. Once the graphic user interface is loaded, a main screen 702 will be displayed to the user. The user may then load a profile 703. In systems having multiple users, each user may have his or her own user settings. These user settings, associated with a user's profile, may reside locally on the system, or may be loaded from a remote server or network device. Additionally, a user may have more than one profile associated with the user. In certain embodiments, a user may switch between profiles by toggling or may use a hold feature to toggle. A user may then load his or her saved settings 704. A user may save new settings 705 through the graphic user interface 705. A customized curve may be created as saved 706. Users may utilize a "save as" feature 707 to save multiple profiles or multiple settings in the same profile. Users may then save those settings to a file 708, residing locally or remotely. Users may also rescale the view 709 of the curve they have created, and they may scale the graph to match specific data 710. The tail of the curve may be aligned 711 and a calculation as to the last position may be made 712. Additional points can be added to a curve 713. Any alteration to the settings of a curve will be verified by the system for validity 714. If a change is not valid, the system will redirect the user to the main screen 702. If the change is valid, the system will update the points on the curve 715 and will recalculate the current B-spline curve 716. When the computer input device is moved 717, the system will determine if any button was pressed 719, and display the speed on the acceleration meter (also known herein as a "mouseometer") 720. When a user is done making changes to the settings. The user will attempt to exit 721, the system will determine that the user has confirmed his or her intention to confirm the changes by verifying that a checkbox is checked 722, the system will then make the settings persistent 723. The user may then exit the graphic user interface 724. Certain embodiments include a history window. This window will display to a user a history of velocities received from the input device. In such embodiments, the system stores and compiles such data.

The terminology used in this application should be interpreted to have the meaning, as understood by one having ordinary skill in the art, or as defined below:

B-spline—B-spline function is a combination of flexible bands that passes through the number of points that are called control points and creates smooth curves. These functions enable the creation and management of complex shapes and surfaces using a number of points. B-spline functions are applied extensively in shape optimization methods. The method discussed throughout this disclosure uses a B-spline function to represent the necessary data, specifically the sensitivity of a HID (Human Interface Device) such as a mouse. It may also be referred to as the "curve" or the "function" in this disclosure. The function (or curve) shown on the graph is a B-spline function. Control points are used to create a smooth curve for defining the sensitivity (Y value) at any given device speed (X value). There are advantages of using a B-spline function for defining an acceleration curve as opposed to other methods. One is the resulting smooth curve that can be achieved using few control points vs the abrupt changes and straight lines from a linear interpolation. A smooth curve means greater definition and smoother transitions between each possible X value. To achieve the same result with a linear interpolation, a user would have to manually manipulate hundreds, if not thousands of points and do the calculations for each. Often acceleration curves are defined by exponential functions.

These offer limited control compared to what can be achieved with a B-spline. Exponential functions force the curve to follow specific behavior which may not always offer the desired results. Other variables are required to bend and manipulate exponential functions, and these can be difficult for many users. The control points of the B-spline can be moved by clicking and dragging on them or by manually entering their values in the entry boxes. Points can also be added and deleted. There is a minimum and maximum number of points allowed.

Sample—A B-spline appears as a smooth curve on screen, but the computer is actually using many small points connected by lines to give this appearance. These may be referred to as "samples".

Vector. Vectors are sequence containers representing arrays that can change in size. The disclosed method uses vectors to store the necessary data for use as a lookup table when applying the users' selected settings to the HID device.

The programming languages used are Python and C++. It makes use of a $3^{rd}$ party programming interface that can be found at http://www.oblita.com/interception.html. This interface is used for intercepting and transforming input device communication. Also used are the open source Python libraries listed:

Os—The OS module in Python provides a way of using operating system dependent functionality. The functions that the OS module provides allows you to interface with the underlying operating system that Python is running on—be that Windows, Mac or Linux. Custom Curve 2.0 only uses os functions for some basic file handling operations (locating, creating, editing, deleting).

Sys—This module provides access to some variables used or maintained by the interpreter and to functions that interact strongly with the interpreter. The disclosed method uses the sys.exit( ) function to avoid starting a $2^{nd}$ instance of the program if it is already running.

Itertools—Provides faster means of iterating through lists.

Collections—Implements specialized container datatypes providing alternatives to Python's general purpose built-in containers, dict, list, set and tuple. The disclosed method only uses the 'deque' function from this module for a list-like container with fast appends and pops on either end.

Subprocess—Allows you to spawn new processes, connect to their input/output/error pipes, and obtain their return codes.

Threading—This module constructs higher-level threading interfaces on top of the lower level 'thread' module. It is used for running multiple I/O-bound tasks simultaneously. The disclosed method uses a thread to read the data from the ccmeter.exe subprocess to the GUI for displaying the input in real time.

Queue—This module implements multi-producer, multi-consumer queues. It is especially useful in threaded programming when information must be exchanged safely between multiple threads. It implements all the required locking semantics.

Psutil—The disclosed method only uses the process_iter function to iterate through the list of windows processes running. Used to ensure only a single subprocess can be run at any given time. There are two subprocesses created & used by the disclosed software ccapplyc.exe and ccmeter.exe. They both apply the settings to the device, but one runs alone and the other runs with the GUI while sending the data for displaying real time updates to the graph.

Copy—Used for making copies of lists. This is not necessary but provides safer alternative methods.

Math—Using the atan, sin and cos functions for some trigonometry calculations involving the slope and the tail.

NumPy—The fundamental package for scientific computing with Python. NumPy's array type augments the Python language with an efficient data structure useful for numerical work, e.g., manipulating matrices. NumPy can also be used as an efficient multi-dimensional container of generic data. Arbitrary data-types can be defined.

Scipy—Contains additional routines needed in scientific work. The disclosed method utilizes interpolate and BSpline functions from this library for calculating the BSpline curve.

Matplotlib—Matplotlib is the plotting library used for displaying the graph and all points on it.

Tkinter—Python's de-facto standard GUI (Graphical User Interface) package.

Acceleration Defined:

Normally, a mouse motion has an expected corresponding behavior from the pointer. If a mouse is moved 1 inch and the cursor travels 100 pixels on screen, then it is expected to always travel 100 pixels for every 1-inch mouse movement. This will be referred to this as a "stable sensitivity" with a 1:1 ratio. With acceleration enabled, a 1-inch motion done slowly might only move the cursor 20 pixels. A motion of the same distance done quicker might move the cursor 200 pixels. It depends on the speed of motion and how the sensitivity is defined for each speed.

Many of the examples will reference "mice" and "pointers", but acceleration is simply a method for associating sensitivity with the speed of a user's motion. It can be applied to various tools and HID devices including mice, accelerometers, any general aiming or pointing tool, virtual reality headsets, anything that can move a cursor, camera or point of view. It can be useful in applications such as gaming, computer aided drafting, computer-controlled robotics, medical devices, general computing and more. The main purpose of applying acceleration to a device is to achieve greater precision than possible with a standard stable sensitivity. It can also provide improved ergonomics by altering the motions necessary.

Determination of Speed of Motion

A device for moving a pointer, associated with a computer input device, typically has a polling rate measured in Hz (cycles per second). Typical rates are 125 Hz, 250 Hz, 500 Hz, 1000 Hz. The device will also be capable of measuring distance each cycle. The standard measurement for mice is DPI (dots per inch) but can be any other unit per unit of linear measure. As discussed herein, DPI or "dots" are used only as representations, and other units may be used interchangeably.

Applying acceleration is done by determining the distance for each cycle and then moving the pointer a corresponding distance for that cycle. This is usually done either by applying a formula or using a lookup table. The main difference is that a device is considered to have acceleration when it does not follow a 1:1 ratio. Again, 1:1 meaning the pointer moves the same number of pixels for each dot resulting in a stable sensitivity.

Features List:

In certain embodiments, Python is an advantageous language for the disclosed methods. Python may not be the fastest language, it is strictly used for the GUI (Graphic User Interface) portion of the software and does not interfere with the performance of the pointing device in any way. In fact, once the desired settings have been achieved, the GUI can be closed entirely and only a very light weight C++ application (less than 1 MB of memory) runs in the background to do the necessary calculations. These calculations are handled in fractions of a millisecond effectively adding no latency at all to device performance, even at 1000 Hz. This may be irrelevant though, as we're focusing on the ideas behind my invention and not the performance or specific implementation.

Interactive Graph:

A graph is provided with X and Y coordinates. The X coordinates represent the device speed. The Y coordinates represent the sensitivity applied to the device. Sensitivity can be thought of as a measure of how far the mouse pointer or cursor moves in response to input.

The X coordinates can be classified as "units per cycle". The units of measurement can vary depending on how the input is interpreted. A device typically has a polling rate and will report some measurement of distance for each cycle. Mice typically measure distance using DPI (dots per inch) and 1000 Hz is a common polling rate. This means a number of 'dots' will be reported every millisecond depending on how far the mouse was moved. Accelerometers will report an amount of acceleration. Gyroscopes will report the amount of change in orientation. The X coordinates on the graph are simply representative of the numbers reported each cycle.

Users are provided basic zooming and panning functionality. Additionally, they can scale the view to fit the data proportionately. Viewing far beyond the boundaries is not allowed.

The systems presents a graph with an X and Y axis. There are a series of points displayed as white dots that make up the control points for the B-spline function which is also displayed on the graph. The B-spline function defines the sensitivity. The X axis represents the speed of motion, the Y axis represents the sensitivity and the B-spline represents the users corresponding settings. The points can be manipulated by clicking and dragging or by manually entering their values in their respective entry boxes displayed on the left. Points can also be added and deleted. To add a point, place the pointer on the dotted line anywhere between existing points and either right click and select "add point" or simply press the "A" key. Points can be deleted similarly by right clicking on a point and selecting "delete point" or simply pressing the "D" key over the point you wish to remove.

The graph also supports standard zoom in/zoom out functions on the mouse wheel and panning with right click. There is an extra feature that scales the view of the graph to match the data. This is useful for cases where the curve becomes skewed along either axis or as quick means of zooming to scale. Depending on the specific input device, this can done by either selecting "tools/rescale view", pressing down on the mouse wheel (mouse button 3), or other means associated with a specific input device.

Various embodiments of this graphic interface are illustrated in the accompanying figures.

Figure 1:
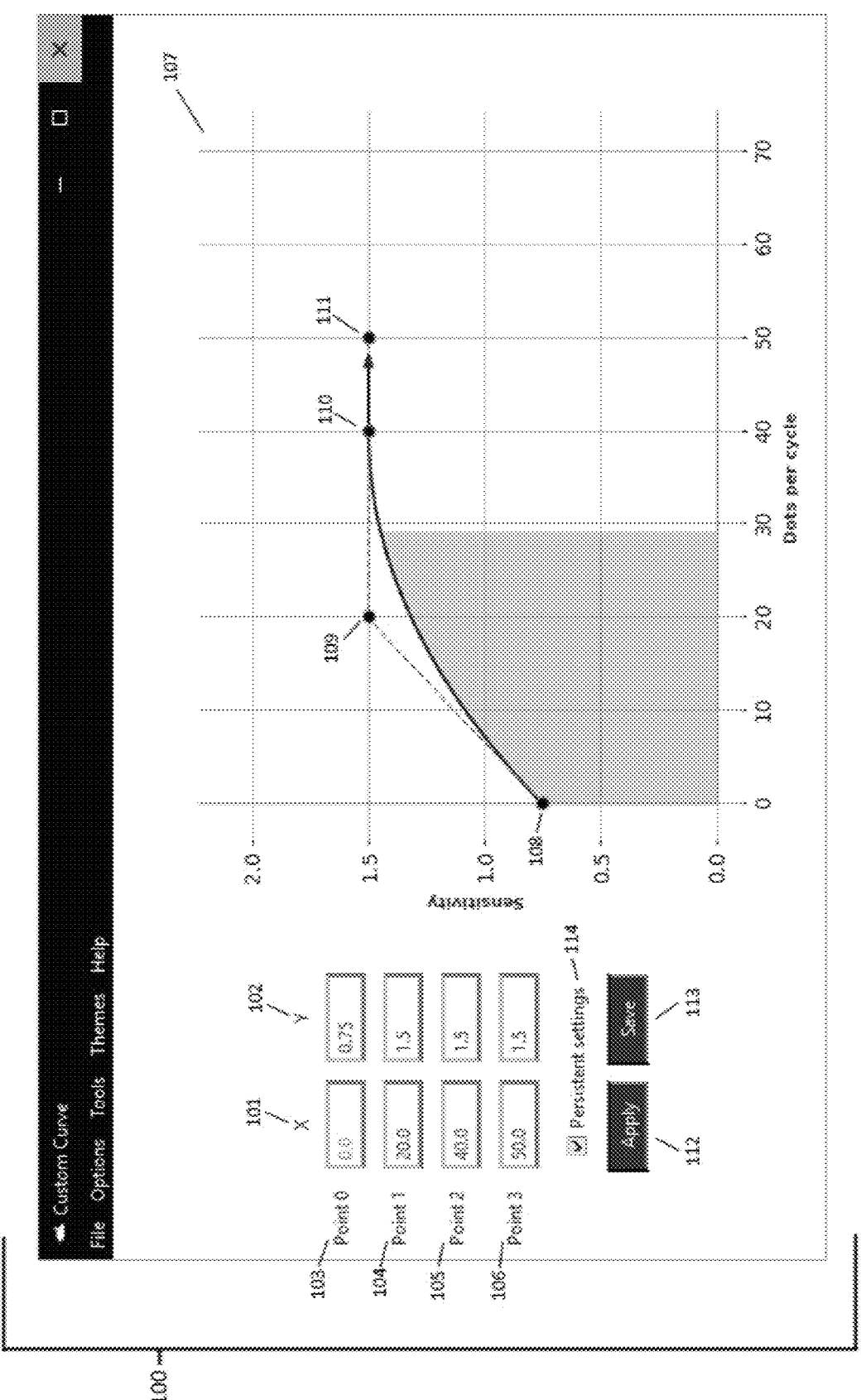
FIG. 1 illustrates an embodiment of a graphical user interface through which a user may establish sensitivity settings for a computer input device, wherein the user is increasing sensitivity.

FIG. 1 illustrates a representative embodiment of a graphic user interface 100 through which a user may adjust wettings. Illustrated in FIG. 1 are four points 103 104 105 106, each having distinct x 101 and y 102 coordinates, but there is no limit as to how many points may be used and fewer points may be used in some embodiments. As illustrated, a user is dragging a point 109 to increase the sensitivity of the input device. The shaded area displays a real time display of the sensitivity as the user drags the point 109 with a pointing device. Alternatively, a user can manually input each coordinate, and the graph will display the changes. The graphic user interface allows the user to apply the settings 112, to save the settings 113, and to make the settings persistent 114, by clicking on the appropriate field.

Figure 2:
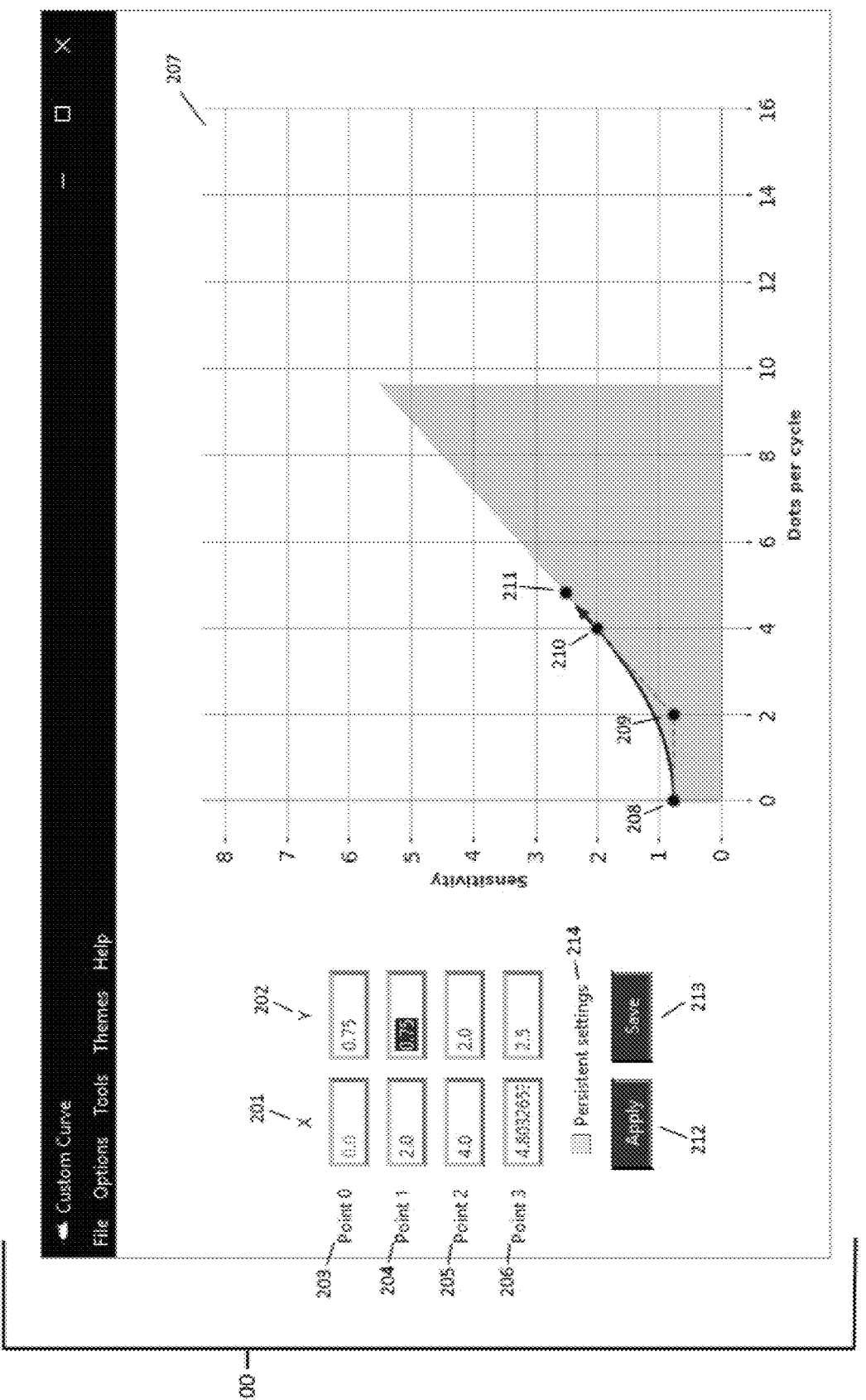
FIG. 2 illustrates an embodiment of a graphical user interface through which a user may establish sensitivity settings for a computer input device, wherein an infinite sensitivity tail is illustrated.

FIG. 2 illustrates the concept of a tail extending past the point 211 illustrated on the graph 207 to infinity. Again, a graphic user interface 200 is displayed to a user. A graph 207 illustrates points on a graph, with a shaded area showing real time display of sensitivity. As a above, FIG. 2 depicts x 201 and y 202 coordinates, and four points 208 209 210 211 on a graph and the same four points 203 204 205 206 having numerical coordinates displayed. In the instance illustrated, there can be an infinite number of points along the tail, as described more fully below. As above, the user may use the input device to select to make the settings persistent 214, apply the settings 212, or save the settings 213.

Figure 3:
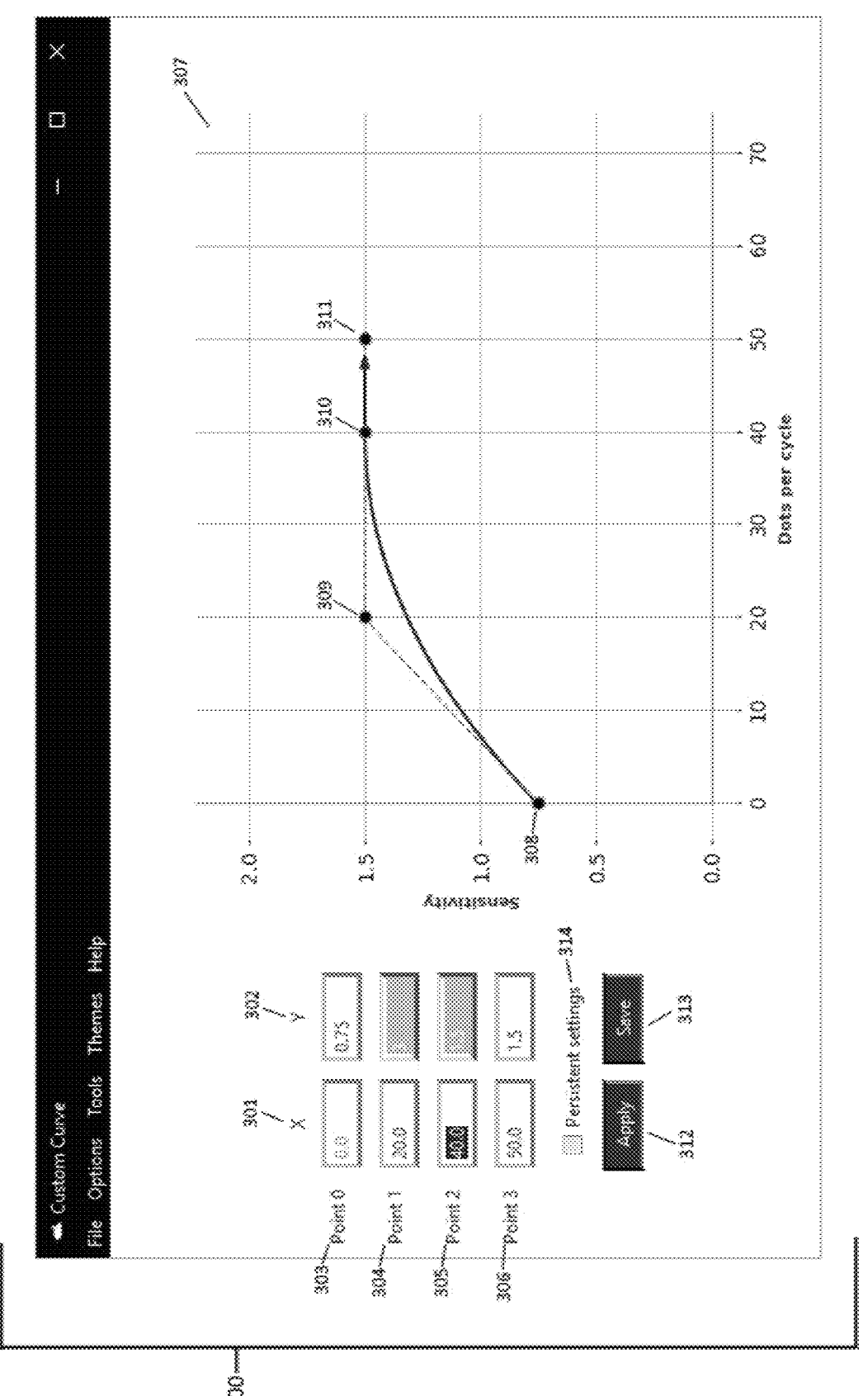
FIG. 3 illustrates an embodiment of a graphical user interface through which a user may establish sensitivity settings for a computer input device, wherein highlighted digits identify erroneously entered values.

FIG. 3 illustrates the same graphic user interface 307 as above, but the user has attempted to use erroneous coordinates. Highlighted coordinates 305 are erroneous. The system will detect these errors and reject them in real time. Numerically entered coordinates for the points 303 304 305 306 numerically, the graph 307 displays the changes for each of the points 308 309 310 311, unless such coordinates are in error.

Figure 4:
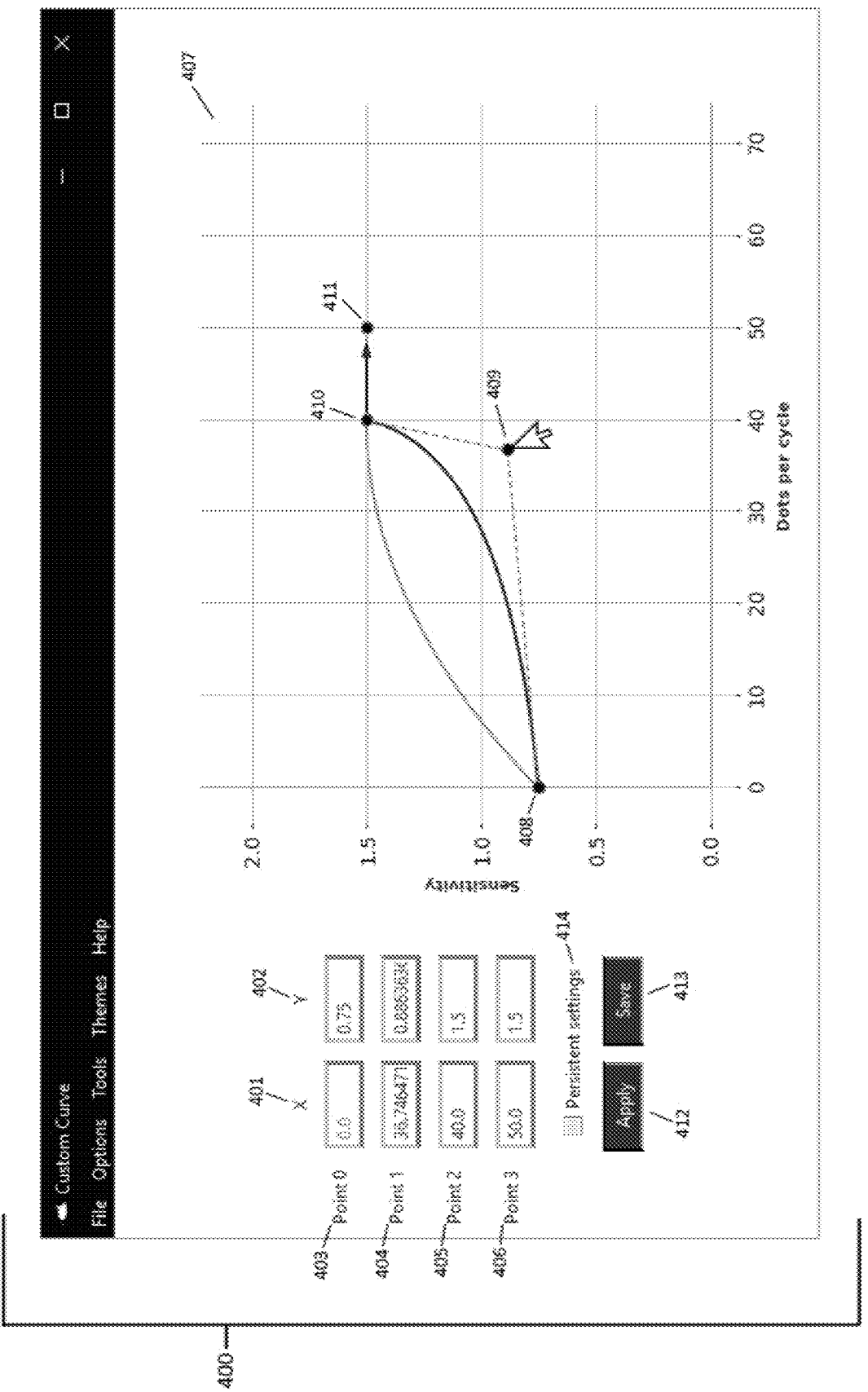
FIG. 4 illustrates an embodiment of a graphical user interface through which a user may establish sensitivity settings for a computer input device, wherein the user is "moving" the curve with a computer input device.

FIG. 4 illustrates an embodiment of the same graphic user interface 400 as above, but illustrated the ability for a user to "click and drag" the curve. As illustrated, a user is dragging a point 409 to move the curve. The system automatically calculates these changes, and displays the change for the moved point 409 as numerical coordinates 404. After revising the curve in this manner, the user may apply 412, save 413, or make the changes persistent 414 by clicking the appropriate field.

Figure 5:
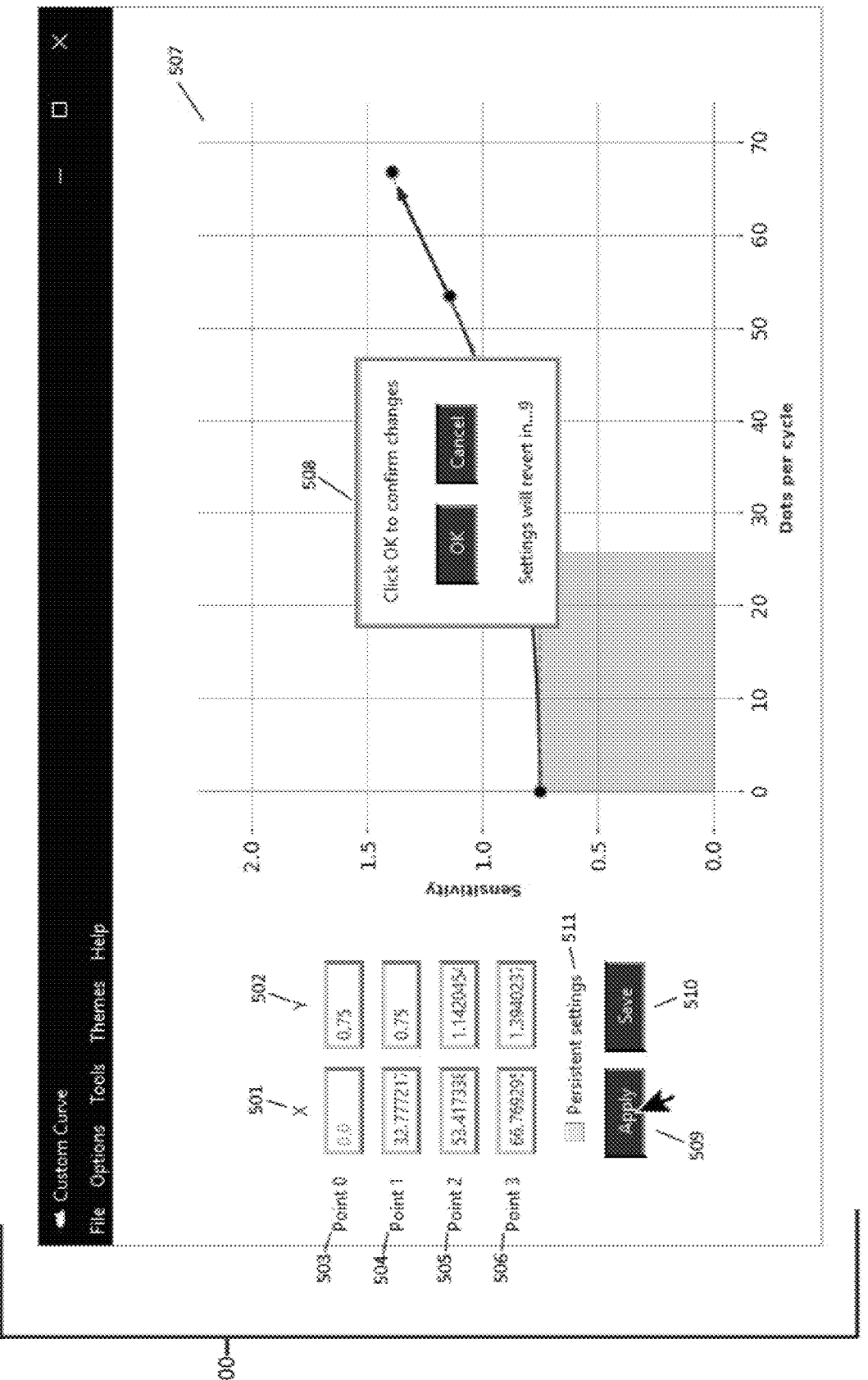
FIG. 5 illustrates an embodiment of a graphical user interface through which a user may establish sensitivity settings for a computer input device, wherein the system is confirming the user's changed settings.

In certain embodiments, the system will confirm that a user is certain that changes in settings should be applied. This prevents unintended errors by a user that may render a system or input device inoperable with sensitivity settings that are inconsistent with proper function. In FIG. 5, the graphic user interface 500 is displaying points 503 504 505 506 on a curve and a dialogue box asking the user to confirm the changes to the settings 508. After the user confirms the changes, the user can them apply 509 the changes, save 510 the changes, or make the changes persistent 511 by clicking the appropriate field.

Users may set an infinite number of points on the curve. As displayed in FIG. 6, eight points 603 604 605 606 607 608 609 610 611 are shown by coordinates and as points 612 613 614 615 616 617 618 619 620 on the graph 621. Although only eight points are depicted in this embodiment, fewer points, or an infinite number of points could be applied in various embodiments.

Methodology:

In certain embodiments, the minimum number of points allowed is four. three points are required to make a curve. The last point of the curve connects to a final point which makes the tail line and this will be described below. The maximum number of points allowed is 9, but more could be allowed. The number 9 was arbitrarily chosen with some considerations. It is assumed to be a more than adequate amount of control points to manipulate the curve to a desired shape. Significantly larger numbers would also increase the amount of calculations required. The amount of room available on the graphic user interface itself must also be considered since each point requires 2 entry boxes to be displayed.

The points have boundaries defined by certain rules in order to prevent impossible conditions, locked states or otherwise erroneous behavior. They cannot be dragged beyond the boundaries. Trying to manually enter an invalid value in the entry box will cause the violating entries to be highlighted in red and no changes will be applied until all entries are valid. Changes made in the entry box are applied after pressing the enter key. Dragging points automatically updates the values in the entry boxes.

Point 0 is the first point and must have an X value of zero to represent no motion. It's Y value must be zero or greater. The curve must have one and only one Y value for every X value in the positive direction. For this reason, a point cannot have a lower X or Y value than that of any previous point. Likewise, a point cannot have a higher X or Y value than that of any subsequent point. This prevents the curve from turning back on itself which would result in multiple Y values for a single X.

Points can be stacked on top of each other sharing exact coordinates to create sharper edges. The highest value point will always be selected when dragging from stacked points in order to prevent a locked state. Similarly, if the points are stacked near or on the upper boundary, the lowest value point will always be selected.

No points are ever allowed to have negative values. Although certain disclosed embodiments do not allow for negative acceleration (Y values), negate acceleration is be possible. The speed of motion (X value) is also always considered to be zero or positive. The direction of the motion does not matter. The appropriate sensitivity will be applied in any direction. The raw data is interpreted as negative and positive for both X and Y coordinates to distinguish direction, but the software presents it as positive for simplicity. Note, the X and Y coordinates of the pointer on the screen are not to be confused with the X and Y coordinates presented in the software which represent speed of motion and sensitivity respectively. A more complex system could be developed that allows for different sensitivities and acceleration settings in each direction, but the disclosed system applies the same settings to all directions.

The upper boundary is set at 2000. Again, this number was arbitrarily chosen, but some considerations were made. Without a boundary, a point could be given a large enough number to cause performance issues. Calculation issues could arise in the GUI itself, although some measures were taken to prevent this (such as having a maximum number of samples allowed for any curve). A vector is created containing the values of the Y coordinates for every whole number X value within the range of the B-spline function. An extremely large vector could cause performance issues as well. On the other end, the boundary must be sufficiently large enough for devices that support settings which can achieve higher X values. For example, having a higher DPI setting will result in higher X values for the same speed of motion.

Notes/Distinctions:

A spline curve has never been used to apply sensitivity. Some current operating systems use a series of points for a linear interpolation, but the disclosed system uses a spline curve with the ability to add and delete points which gives far greater control and, to the best of my knowledge, has never been done or even suggested. Because there may be many X values (more with higher DPI), using a smooth curve instead of 5 points connected by straight lines means a much smoother transition of sensitivity from one speed to another. 4 straight lines means only 4 transition states. The disclosed system adjusts the number of samples to fit the curve resulting in hundreds or even thousands of transition states at no extra computational cost. Additionally, many existing operating systems do not allow for initial sensitivities (Y values) other than zero Some operating systems claim a GUI could be created but none have ever been developed to manipulate these points.

Much knowledge is required to change such settings because they are stored as hexadecimal values that run together deep in the registry and documentation is lacking.

The graph provided in the disclosed system displays the speed of motion as X and the sensitivity as Y. It means the pointer distance traveled is the Y value multiplied by the X value. In contrast, certain operation systems represent the data by showing Y as the pointer distance traveled. Showing Y as the sensitivity is more intuitive. A stable sensitivity is more easily recognized this way as a horizontal line with a single Y value.

Tail:

In certain embodiments, the tail will always be at the end of the curve and is a straight line connecting the last 2 points. As depicted in FIG. 2, It is denoted as a line with an arrow on the end indicating that the function will continue in a straight path following the slope of the tail line to infinity. There is an "auto align tail" feature which will automatically align it with the slope of the B-Spline as it as calculated at the final 2 samples. This feature maintains uniformity if desired.

The last control point of the B-spline curve is connected to one more point which forms a straight line with an arrow extending beyond the curve. This is called the Tail and it defines what sensitivity (Y values) should be applied to speeds (X values) that go beyond the curve.

We must account for every possible X value from zero to infinity. Zero represents no motion and no assumption should be made about what speed a device may achieve or report. Rather than deciding for the user which values to apply beyond the curve, we provide the tail in case they wish to apply a limit or change the behavior in some way. The length of the tail does not matter. It only defines the slope to be followed from beyond the last point of the curve. The tail can be automatically calculated to match the final slope of the curve. When this is done, the system calculates its length proportionately to the length of the curve for aesthetics.

Methodology:

Like the other points, the last point cannot have values lower than any previous point so the tail will never point down or backwards. If the last 2 points share an X value, this means they are either stacked or the arrow is pointing straight up. This would create an infinite sensitivity. Such behavior is ignored and treated as if the line were laying horizontally, effectively applying a sensitivity limit (a stable sensitivity) after the B-Spline.

Notes/Distinctions:

Because the speed of motion a device may report cannot be known, X values up to infinity must be considered. The curve itself obviously cannot extend to infinity. Another solution was to set some arbitrary value after the last point. Ultimately the tail was the solution, allowing the user to decide how to handle speeds that extend beyond the defined curve. Also, adding the feature to automatically align the tail to match the final slope of the B-spline function saves the user the trouble of doing complex math or struggling to eyeball it if they want that uniform behavior.

Figure 6:
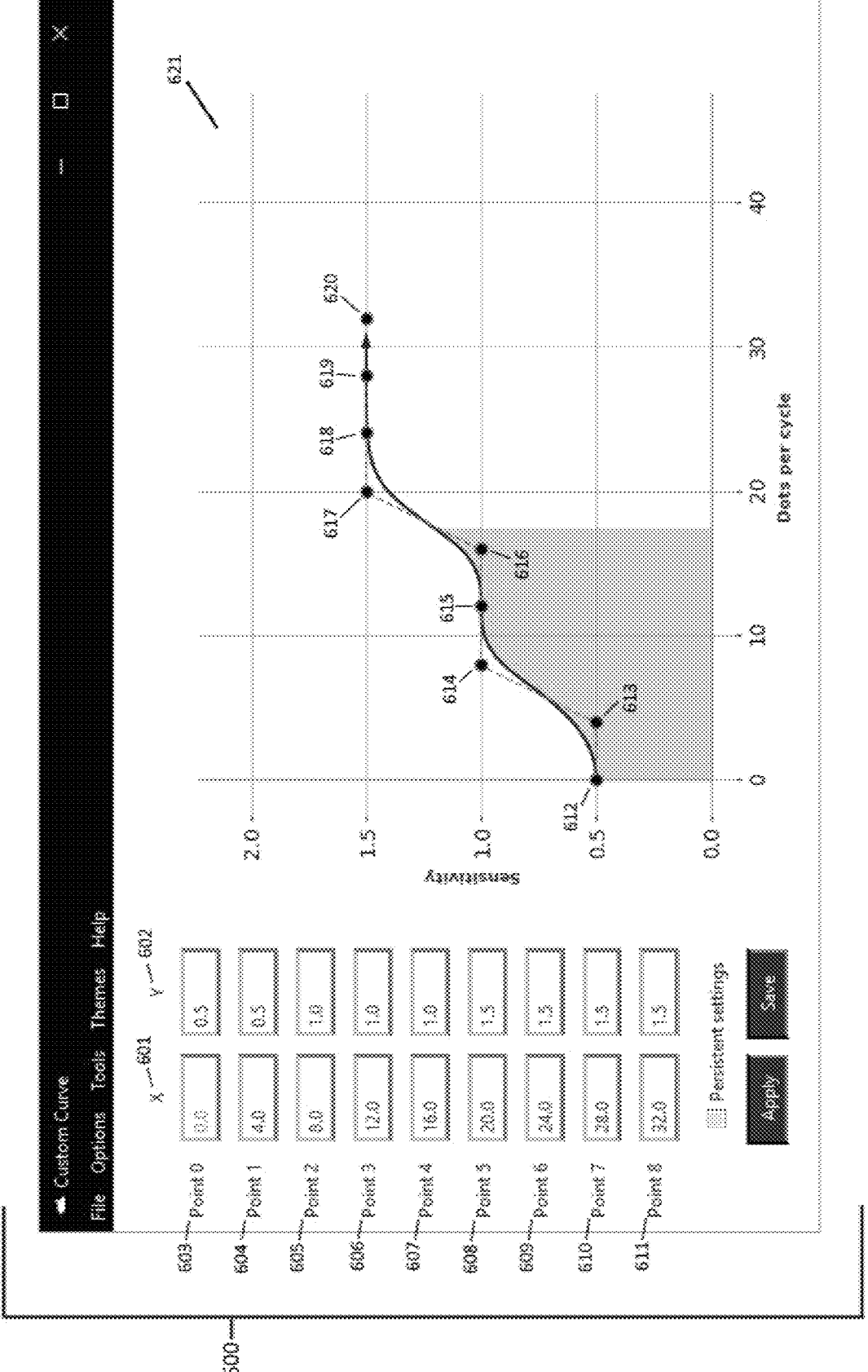
FIG. 6 illustrates an embodiment of a graphical user interface through which a user may establish sensitivity settings for a computer input device, wherein the user is establishing multiple sensitivity points.

Mouseometer:

The purpose of the mouseometer is to display the speed of motion in real time as it relates to the sensitivity of a device. This is done by shading the area under the function and up to the corresponding X value that matches the current speed of whichever device is moving the pointer. The shaded area is illustrated in FIG. 1, FIG. 2, and FIG. 6.

Methodology:

There are certain issues to overcome in order to display the mouseometer in a smooth manner without latency.

Drawing raw input data as it comes in will appear incredibly jittery and jumpy. At 1000 Hz, the system is updating every millisecond and there are frequently large variations in the numbers reported. Also, attempting to display at 1000 frames per second will be stressful for many machines so the rate of display was lowered. Lowering the frame rate means that not every report will be drawn and this alone still does not provide a smooth picture because of the large variance between numbers reported each frame. Also, we want users to see how fast they're moving, not just how fast they are moving every so many frames.

The solution was to add every number reported to a list and use the largest number from the list after a defined interval. To smooth the picture out, a series of frames are added using values that will transition incrementally and equidistant from the last reading to the current. For example, if the fastest motion reported during an interval is 20 and the fastest motion of the next interval is 80, you might see a series of frames showing the shaded area at x=20, 30, 40, 50, 60, 70 and finally 80. If the next interval reports a 50, you would see x=80, 75, 70, 65, 60, 55 and 50. The frame rate and number of frames to wait before getting the next report can easily be adjusted through 2 variables and extensive testing was done to ensure a balance of smooth picture, minimal latency and acceptable performance.

The user is provided with a real time display of the device speed.

This can be achieved a multitude of ways, but in certain embodiments, the area under the graph up to the corresponding X value is shaded. The lower boundary of the shaded region is the X-axis. The upper boundary is the B-spline function that represents the applied sensitivity. The left boundary is the Y-axis and the right boundary is the X-value that matches the current speed of the device.

Certain methods are applied to blend the frames together for a smoother picture. This is done because viewing raw data can be difficult given the speed at which it may be coming in and the large variance in numbers between each cycle. It's important these methods take care to preserve an accurate representation of the speeds achieved.

Notes/Distinctions:

A significant feature of the disclosed method is the mouseometer. It is a simple graphical display, but designed with simplicity for the user. The ability to see the speed of motion in relation to the sensitivity in real time is critical information that has never before been made available. It is a great tool for helping even the most novice users to easily understand the information presented. Having this information is also immensely helpful for assisting the user to quickly find effective settings. All prior art solutions have left users struggling to understand what they are looking at and how it is being applied.

The methods for displaying the device speed as it relates to the acceleration curve in real time could vary. It wouldn't necessarily have to be a shaded area. It could be done several ways such as a moving line or even just numbers being reported, but the key distinction is that it has never been done or suggested, in any form, because "acceleration" in the current context is an esoteric concept and simply hasn't been given enough consideration.

Applying the Settings to the Device:

As previously mentioned, a vector is used as the lookup table referenced in the C++ code for applying the appropriate sensitivity. While code written in C++ is shown as an example, skilled artisans will appreciate that other coding languages can be used to achieve similar results, and similar or equivalent code can be used in alternative coding languages. Only whole number X values are considered because the system only reports whole numbers as a measure of distance each cycle. Since the samples of the B-Spline will almost certainly never fall exactly on the whole numbers of X, it is necessary to do a best approximation using the 2 closest samples to get the Y value for each whole number of X.

Once have the appropriate X and Y values have been established, the logic for applying the appropriate sensitivity is very simple and therefore also very fast.

```
// if within table range
if (absX <= table_size)
{
    //use the table
    dx *= table[absX – 1];
}
else
{
    //apply the slope
    dx *= slope * (absX – 1 – table size) + table[table_size];
}
```

The speed of motion is reported, compared against the lookup table and multiplied by the appropriate value. If the speed exceeds the X values in the look up table, then it is multiplied by the slope plus the last Y value of the B-spline which is the last element in the table. Then the remainder is calculated and apply the changes are applied.

```
// add remainder.
dx += remX;
dy += remY;
// get next remainder
remX = dx – (int)dx;
remY = dy – (int)dy;
// apply the changes
mstroke.x = (int)dx;
mstroke.y = (int)dy;
```

This is the entire logic portion used to apply the settings to an input device. The GUI does not even have to be running. It's only there for making changes and can be shut off once the desired settings have been achieved. Settings are saved to a text file and read only once by the C++ executable. The only information necessary for the executable are the Y coordinates for the vector and a single value for the slope. The Y coordinates are placed in order in the vector and the vector indices are used for the X coordinates. This is safe because we are only concerned with whole number values of X.

A method of applying the settings is using a lookup table and a formula.

There are potential downsides to either method, so we use both. A lookup table will have a set size, so how do you handle cases where a value is larger than any in the lookup table? The solution is to apply the formula of the slope of the tail. A lookup table is created for each X value within the range of the B-spline. If we encounter an X value larger than this, we apply the slope of the tail.

As previously mentioned, there are disadvantages to only using a formula. They will not supply the same amount of control and users cannot be as creative with their solutions. It can be much more difficult to get specific desired settings when following a formula. The disclosed method allows users to create their curve to a desired shape and size, then apply a simple formula after the curve by means of the tail.

Boundaries

There are multiple boundary conditions that must observed.

The X value of any point can never be less than that of any previous point or greater than that of any subsequent point. This prevents the curve from folding back on top of itself resulting in multiple Y values for a single X. This would be an impossible condition because you cannot have more than one sensitivity for a single speed. You can allow for shared X values in order to create sharper edges.

The X value of the initial point must always be zero because we must account for all speeds (X values) from zero to infinity. The Y value of this or any other point do not need to be restricted.

The graph will require an upper boundary. Although we are able to account for any speeds because of the tail, we should not allow points to be plotted at extreme numbers. Depending on the system, you may encounter performance issues or mathematical limits. A lookup table is created for all X values within the range of the curve, so an extreme value would result in an extremely large lookup table. The GUI itself may have performance issues trying to calculate a B-spline curve of significant size.

While it should have an upper boundary, it should remain large enough to support many devices and use cases. Significantly large speeds may be achieved depending on the device, settings and user.

Exploitation Resistance

Developers of computer games often implement "anti-cheat" measures to preserve the integrity of gameplay. In some instances, a game developer may implement settings that prevent users from implementing changes in system settings, including settings related to input devices, during gameplay. A mechanism to allow the disclosed methods to be used, during gameplay, or during the use of any application, is the addition of additional functionality. In certain embodiments, such functionality can be added by employing a driver, or other computer readable program or instruction, to delay the implementation of new settings for a specified period of time. In certain embodiments, the delay is one second, but any time period may be used, provided it sufficient to overcome settings in other programs to deter instantaneous alterations in settings.

The effect of not allowing instantaneous changes means that users cannot continuously or instantly instruct the cursor where to move. Any attempt to directly move the cursor to a set position could only be done once per second and the change would always happen one second late. In most competitive gaming environments, this amount of delay would render such an exploit useless. It would also require the user to be moving the mouse, or other input device, because an additional driver may not allow for direct control over the cursor by any other means such as holding a button or programmatically. In such embodiments, the driver is now "exploit proof" in that it cannot be effectively used for anything other than applying sensitivity or acceleration profiles to a device.

Use of a Lookup Table to Modulate Sensitivity

In certain embodiments, the disclosed methods comprise additional functionality to enable measurement of changes in x and y coordinates independently or as a single, two-dimensional change in distance. A lookup table may be used, in certain embodiments, to apply the appropriate sensitivity by using calculated velocity to determine the corresponding sensitivity. While some embodiments will measure velocity in dots over a specified period of time (yielding a computation of dots per millisecond, or dots per some other measure of time), other embodiments will measure dots per update, wherein the. If dots per update is calculated as the measure of velocity, velocity will be calculated only as the distance the mouse has moved during a period of an update. When dots per update is used as the measure for velocity changes over x and y coordinates for distance, there is no need for interpolation since only integers (whole numbers) will be reported as the velocities and a simple lookup table can be made comprising the appropriate sensitivity for each whole number under the curve on the graph. However, once distance is measured in two dimensions or measure in dots per millisecond or dots per unit of time, velocities may not be whole numbers. A method of interpolation can be used to get an approximation of the appropriate sensitivity for values between whole numbers. Certain embodiments utilize linear interpolation, but other methods may be used.

DPI "dots per inch", often called CPI "counts per inch" as a measure of resolution when reading the surface to detect movement. There is also the polling rate measured in Hz which is how frequently it can send an update to the system. An input device running at 1000 Hz means it reports to the system 1000 times a second, although there are typically inconsistencies that keep it from being exactly once a millisecond. Also, it does not necessarily report at all when not moving. Each time the input device reports to the system one update is complete. Cursor instructions in certain operating systems currently come in as a count per update or dots per update as integers for both the X and Y axis.

In alternative embodiments, interpolation is not utilized, rather the x and y position and of the spline curve are evaluated at each update. While this would yield greater accuracy, it would also require more computing cycles to calculate.

Curve Granularity

Certain embodiments allow for even more accurate results when determining the appropriate sensitivity to apply. The table can be normalized at the time of its creation. For example, if a user defines a curve that ranges from 0 to 10 dots per millisecond or dots per update on the graph, rather than creating a table of size 10, the curve can be normalized to a much larger size. For example, the table could be scaled to a size of 200 at the cost of a simple multiplication function done in each update. In such an example, such scaling would yield 200 accurately plotted points to represent all the possible sensitivities between 0 and 10 rather than having only 10 values. Further, additional values can be interpolated between these 200 values for even further accuracy.

Certain embodiments allow for very large curves can also be scaled down to prevent tables that are too large for the existing memory in a given computer system. In representative code for such a method, the variables associated with this are called "ScaleX" and "ScaleY". Each variable is an array of variables, as each profile needs its own variables. A user is then enabled to adjust how much "curve granularity" is desired for a specific application. Increasing curve granularity increases the table size to improve the accuracy of the curve's representation.

Scaling

Curve manipulation is useful because users can simply choose the desired curve shape and then scale it to fit hand speeds, or desired sensitivity or velocity, with the help of the mouseometer. Certain embodiments also comprise the ability to scale the entire curve or sections of a curve thought the use of locking points or scaling relative to other points or areas of the graph.

Representative Code

Below is code, written in C++ that provides a representative embodiment of some of the methods disclosed herein. Specifically, the code below illustrates code that is executed for each update. In certain embodiments, at 1000 hz, this code would be executed every millisecond, though the code could be executed over different periods of time. Skilled artisans will appreciate that similar code can be written in other languages to achieve the same or similar results. Note that text following "II" are descriptive comments, not executable code.

```
dx = static_cast<double>(mstroke.x); // dx = dots in the X direction for this update
dy = static_cast<double>(mstroke.y); // dy = dots in the Y direction for this update
p = static_cast<int>(profile.load( )); // atomic variable indicates the current profile
// enables clock to figure velocity based on distance/time
if (maxTimeBetweenUpdates[p] > 1) // is "dots per millisecond' in use?
{
// Get time
QueryPerformanceCounter(&stop);
timeBetweenUpdates = static_cast<double>(stop.QuadPart – start.QuadPart) * pollingRate /
PCfreq.QuadPart;
start = stop;
// check we haven't exceeded the boundaries for max and min time between updates
if (timeBetweenUpdates > maxTimeBetweenUpdates[p])
{
timeBetweenUpdates = maxTimeBetweenUpdates[p];
}
if (timeBetweenUpdate < minTimeBetweenUpdates[p])
{
timeBetweenUpdates = minTimeBetweenUpdates[p];
}
}
else // using 'dots per update'
{
// profile specific variable must be reset to 1 when user switches to a profile that uses 'dots per
update'.
timeBetweenUpdates = 1;
}
// get velocity
if (independentAxis[p] == 0) // figure a single velocity?
{
absX = sqrt(dx * dx + dy * dy) / timeBetweenUpdates * scaleX[p];
absY = sqrt(dx * dx + dy * dy) / timeBetweenUpdates * scaleY[p];
}
```

```
else // independent x/y velocities
{
absX = abs(dx / timeBetweenUpdates * scaleX[p]);
absY = abs(dy / timeBetweenUpdates * scaleY[p]);
}
// output for the mouseometer is needed only while the GUI is active
std::cout << static_cast<double>(abs(dx) / timeBetweenCycles) << " " <<
static_cast<double>(abs(dy) / timeBetweenCycles) << std::endl;
// Determine if the velocities are under the curve
if (absX < tableX_size[p])
{
//get x value from table with linear interpolation
dx *= tableX[p][static_cast<int>(absX)] * ((static_cast<int>(absX) + 1) – absX) +
tableX[p][static_cast<int>(absX) + 1] * (absX – static_cast<int>(absX));
}
else
{
//get x value with the slope formula
dx *= slopeX[p] * (absX – tableX_size[p]) + tableX[p][tableX_size[p]];
}
if (absY < tableY_size[p])
{
//y table
dy *= (tableY[p][static_cast<int>(absY)] * ((static_cast<int>(absY) + 1) – absY) +
tableY[p][static_cast<int>(absY) + 1] * (absY – static_cast<int>(absY))) * pitch[p];
}
else
{
//y slope
dy *= (slopeY[p] * (absY – tableY_size[p]) + tableY[p][tableY_size[p]]) * pitch [p];
}
if (modifySens.load( )) // sensitivity multiplier toggle?
{
// apply multiplier
dx *= toggleSensX[p];
dy *= toggleSensYfp];
}
// add remainders
dx += remX;
dy += remY;
// get new remainder
remX = dx – round(dx);
remY = dy – round(dy);
// apply the changes
mstroke.x = static_cast<int>(round(dx));
mstroke.y = static_cast<int>(round(dy));
interception_send(context, device, &stroke, 1);
```

Additional User Controls

In certain embodiments, the system will ask a user to click "OK" to accept changes to settings in order to prove the input device is still functional, given the new settings. If the user fails to click on the button within a set amount of time (12 seconds in certain embodiments), the settings will revert to their previous state. In some embodiments, the user can also hit "esc" or click "cancel" to reject changes and revert to the previous state. By design, some embodiments will not display the "OK/Cancel" option box under the cursor and there is no way to click it via keyboard shortcuts. This is a safety mechanism to ensure the device remains in a functional state (meaning the user can still control the cursor with the device) by forcing the user to demonstrate they can move the cursor with enough precision to click on the "OK" button.

Some embodiments also allow users to utilize the following keystrokes:

"Shift" allows the user to scale in much lower increments

Holding "Ctrl" while scaling scales the curve relative to the lowest point

Holding "Alt" while scaling scales the curve relative to the highest point.

Additionally, certain embodiments will allow a user to scale the x/y curve to a predetermined scale with a single keystroke.

Use of Edge Points

In certain embodiments, users may drag a stack of points. In such an embodiment, edge points function as multiple points stacked upon each other. This creates a sharp corner with a single point, instead of needing multiple points for the same effect. This allows users to easily manipulate the spline curve and allows for a straight section to be created easily.

While the invention has been described and illustrated with reference to certain particular embodiments thereof, those skilled in the art will appreciate that the various adaptations, changes, modifications, substitutions, deletions, or additions or procedures and protocols may be made without departing from the spirit and scope of the invention. It is intended, therefore, that the invention be defined by the scope of the claims that follow and that such claims be interpreted as broadly as reasonable.

What is claimed is:

1. A method for applying data from an input device in a computerized system comprising the steps of:

displaying a graphic interface to user, through which a user may input and alter first sensitivity settings of an input device, the graphic interface comprising:

a first graph displaying first x coordinates and first y coordinates, on a spline curve, wherein the first x coordinates represent device speed and the first y coordinates represent the sensitivity of the device, wherein the first x coordinates and the first y coordinates can be manipulated by the user by clicking and dragging one or more control points with an the input device or by manually entering numeric values for each control point, and wherein the user can add or remove a point to the first graph by clicking on the desired coordinate on the first graph;

a numeric display of values for a point 0 comprising a first numeric x coordinate and a first numeric y coordinate;

a numeric display of values for a point 1 comprising a second numeric x coordinate and a second numeric y coordinate;

a numeric display of values for a point 2 comprising a third numeric x coordinate and a third numeric y coordinate;

an option to save the first sensitivity settings; and an option to apply the first sensitivity settings;

displaying a first profile to the user;

displaying an option for the user save selected settings to the first user profile;

displaying a second profile to the user;

displaying an option for the user save selected settings to the second profile;

applying the settings of the first user profile, as selected by the user;

implementing the selected settings of the first profile;

receiving an input from the user to implement the selected settings of the second user profile;

implementing the selected settings of the second user profile;

implementing a time delay before implementation of the settings of the first profile or the settings of the second profile; and shading an area under an x value the spline curve to correspond with the current speed of the input device; and aligning a tail of the spline curve to align with a slope as it was calculated between two control points; and determining y coordinates for x coordinates beyond the displayed spline curve displayed to the user on the graphic interface.

2. The method for applying data from the input device in a computerized system of claim 1 further comprising the steps of:

obtaining one or more erroneous first x coordinates or one or more erroneous first y coordinates from the user;

detecting the one or more erroneous first x coordinates or the one or more first y coordinates; and disallowing the one or more erroneous first x coordinates and disallowing the one or more erroneous first y coordinates on the graphic interface.

3. The method for applying data from the input device in a computerized system of claim 2 further comprising the step of altering a rate at which frames are displayed using values that transition incrementally, and equidistantly, from a prior rate at which frames are displayed.

4. The method for applying data from the input device in a computerized system of claim 3 further comprising the step of establishing settings for a second user, comprising the steps of:

displaying the graphic interface to the second user, through which the second user may input and alter second sensitivity settings of the input device, the graphic interface comprising:

a second graph displaying second x coordinates and second y coordinates, wherein the second x coordinates represent device speed and the second y coordinates represent the sensitivity of the device;

a numeric display of values for a point 0 comprising a fourth numeric x coordinate and a fourth numeric y coordinate;

a numeric display of values for a point 1 comprising a fifth numeric x coordinate and a fifth numeric y coordinate;

a numeric display of values for a point 2 comprising a sixth numeric x coordinate and a sixth numeric y coordinate;

an option to save the second sensitivity settings; and an option to apply the second sensitivity settings; and applying the second sensitivity settings selected by the second user.

5. The method for applying data from the input device in a computerized system of claim 4 further comprising the step of displaying a dialogue box to the user or the second user to confirm changes made to the first sensitivity settings or the second sensitivity settings.

6. The method for applying data from the input device in a computerized system of claim 5 wherein a non-transitory computer readable media encodes computer readable instructions for each step of the method is disposed within the input device.

7. A non-transitory computer-readable medium having computer executable instructions for performing a method for applying data from an input device in a computerized system, wherein the method for applying data from the input device in a computerized system comprises the steps of:

displaying a graphic interface to user, through which a user may input and alter first sensitivity settings of an the input device, the graphic interface comprising:

a first graph displaying first x coordinates and first y coordinates, on a spline curve, wherein the first x coordinates represent device speed and the first y coordinates represent the sensitivity of the device, wherein the first x coordinates and the first y coordinates can be manipulated by the user by clicking and dragging one or more control points with an input device or by manually entering numeric values for each control point, and wherein the user can add or remove a point to the first graph by clicking on the desired coordinate on the first graph;

a numeric display of values for a point 0 comprising a first numeric x coordinate and a second numeric y coordinate;

a numeric display of values for a point 1 comprising a first numeric x coordinate and a second numeric y coordinate;

a numeric display of values for a point 2 comprising a third numeric x coordinate and a third numeric y coordinate;

an option to save the first sensitivity settings; and an option to apply the first sensitivity settings;

displaying a first profile to the user;

displaying an option for the user save selected settings to the first user profile;

displaying a second profile to the user;

displaying an option for the user save selected settings to the second profile;

applying the settings of the first user profile, as selected by the user;

implementing the selected settings of the first profile;

receiving an input from the user to implement the selected settings of the second user profile;

implementing the selected settings of the second user profile;

implementing a time delay before implementation of the settings of the first profile or the settings of the second profile; and shading an area under an x value the spline curve to correspond with the current speed of the input device; and aligning a tail of the spline curve to align with a slope as it was calculated between two control points; and determining y coordinates for x coordinates beyond the displayed spline curve displayed to the user on the graphic interface.

8. The non-transitory computer-readable medium having computer executable instructions for performing a method for applying data from the input device in the computerized system of claim 7 wherein the method for applying data from an input device in the computerized system further comprises the steps of:

obtaining one or more erroneous first x coordinates or one or more erroneous first y coordinates from the user;

detecting the one or more erroneous first x coordinates or the one or more first y coordinates; and disallowing the one or more erroneous first x coordinates and disallowing the one or more erroneous first y coordinates on the graphic interface.

9. The non-transitory computer-readable medium having computer executable instructions for performing a method for applying data from the input device in the computerized system of claim 8 further comprising the step of altering a rate at which frames are displayed using values that transition incrementally, and equidistantly, from a prior rate at which frames are displayed.

10. The non-transitory computer-readable medium having computer executable instructions for performing a method for applying data from the input device in the computerized system of claim 9 wherein the method for applying data from the input device in the computerized system further comprises the steps of:

displaying the graphic interface to the second user, through which the second user may input and alter second sensitivity settings of an input device, the graphic interface comprising:

a second graph displaying second x coordinates and second y coordinates, wherein the second x coordinates represent device speed and the second y coordinates represent the sensitivity of the device;

a numeric display of values for a point 0 comprising a fourth numeric x coordinate and a fourth numeric y coordinate;

a numeric display of values for a point 1 comprising a fifth numeric x coordinate and a fifth numeric y coordinate;

a numeric display of values for a point 2 comprising a sixth numeric x coordinate and a sixth numeric y coordinate;

an option to save the second sensitivity settings; and an option to apply the second sensitivity settings; and applying the second sensitivity settings selected by the second user.

11. The non-transitory computer-readable medium having computer executable instructions for performing a method for applying data from the input device in the computerized system of claim 10 wherein the method for applying data from an input device in the computerized system further comprises the step of displaying a dialogue box to the user or the second user to confirm changes made to the first sensitivity settings or the second sensitivity settings.

12. The non-transitory computer-readable medium having computer executable instructions for performing a method for applying data from the input device in the computerized system of claim 11 wherein the non-transitory computer readable media encodes computer readable instructions for each step of the method for performing a method applying data from an input device in a computerized system is disposed within the input device.

* * * * *